United States Patent
Le Huerou et al.

(10) Patent No.: US 10,834,067 B2
(45) Date of Patent: *Nov. 10, 2020

(54) METHOD OF ACCESS BY A TELECOMMUNICATIONS TERMINAL TO A DATABASE HOSTED BY A SERVICE PLATFORM THAT IS ACCESSIBLE VIA A TELECOMMUNICATIONS NETWORK

(71) Applicant: Orange, Paris (FR)

(72) Inventors: Emmanuel Le Huerou, Saint Quay Perros (FR); Eric Beaufils, Langoat (FR)

(73) Assignee: ORANGE, Paris (FR)

(*) Notice: Subject to any disclaimer, the term of this patent is extended or adjusted under 35 U.S.C. 154(b) by 73 days.

This patent is subject to a terminal disclaimer.

(21) Appl. No.: 16/036,346

(22) Filed: Jul. 16, 2018

(65) Prior Publication Data

US 2018/0324169 A1 Nov. 8, 2018

Related U.S. Application Data

(63) Continuation of application No. 14/368,218, filed as application No. PCT/FR2012/052953 on Dec. 17, 2012, now Pat. No. 10,027,642.

(30) Foreign Application Priority Data

Dec. 23, 2011 (FR) ..................... 11 62439

(51) Int. Cl.
*H04L 29/06* (2006.01)
*G06F 21/42* (2013.01)
*H04W 12/06* (2009.01)

(52) U.S. Cl.
CPC .............. *H04L 63/08* (2013.01); *G06F 21/42* (2013.01); *H04L 63/10* (2013.01); *H04W 12/06* (2013.01)

(58) Field of Classification Search
CPC ..... H04L 63/08; H04L 63/10; H04L 63/0428; H04L 63/0823; G06F 21/42; G06F 21/6218
See application file for complete search history.

(56) References Cited

U.S. PATENT DOCUMENTS

| 8,468,582 B2 * | 6/2013 | Kuang | H04L 63/08 380/277 |
| 2008/0320560 A1 * | 12/2008 | Casey | H04L 63/10 726/3 |

(Continued)

FOREIGN PATENT DOCUMENTS

| EP | 1054545 A3 | 11/2000 |
| WO | 2010136323 A1 | 12/2010 |

OTHER PUBLICATIONS

International Search Report and Written Opinion dated Jan. 31, 2013 for corresponding International Application No. PCT/FR2012/052953, filed Dec. 17, 2012.

(Continued)

*Primary Examiner* — Ali S Abyaneh
(74) *Attorney, Agent, or Firm* — David D. Brush; Westman, Champlin & Koehler, P.A.

(57) ABSTRACT

A method enabling a telecommunications terminal to access a database hosted by a service platform that can be accessed via a telecommunications network. The method includes: transmitting, to a second terminal associated with a mobile identifier of a second telecommunications network, information representing a request for the first terminal to access the database; in the second terminal, sending a response to the access request to an authentication server of the platform; in the authentication server, when a response to the access request is received, verifying the mobile identifier of the second network, and optionally validating the access of (Continued)

the first terminal to the database depending on the outcome of the verification.

11 Claims, 3 Drawing Sheets

(56) References Cited

U.S. PATENT DOCUMENTS

| | | | | |
|---|---|---|---|---|
| 2010/0229229 | A1* | 9/2010 | Kumar | H04L 63/10 726/7 |
| 2011/0208659 | A1* | 8/2011 | Easterly | G06Q 20/027 705/79 |
| 2012/0102566 | A1* | 4/2012 | Vrancken | G06F 21/335 726/20 |
| 2013/0086637 | A1* | 4/2013 | Cotterill | G06F 21/40 726/4 |

OTHER PUBLICATIONS

International Preliminary Report on Patentability dated Nov. 18, 2013 for corresponding International Application No. PCT/FR2012/052953, filed Dec. 17, 2012.
Office Action dated Nov. 5, 2015 for corresponding U.S. Appl. No. 14/368,218, filed Jun. 23, 2014.
Office Action dated Jul. 12, 2016 for corresponding U.S. Appl. No. 14/368,218, filed Jun. 23, 2014.
Final Office Action dated May 2, 2017 for corresponding U.S. Appl. No. 14/368,218, filed Jun. 23, 2014.
Notice of Allowance dated Mar. 14, 2018 for corresponding U.S. Appl. No. 14/368,218, filed Jun. 23, 2014.

* cited by examiner

METHOD OF ACCESS BY A TELECOMMUNICATIONS TERMINAL TO A DATABASE HOSTED BY A SERVICE PLATFORM THAT IS ACCESSIBLE VIA A TELECOMMUNICATIONS NETWORK

CROSS-REFERENCE TO RELATED APPLICATIONS

This Application is a Continuation Application of U.S. patent application Ser. No. 14/368,218, filed Jun. 23, 2014 and issued as U.S. Pat. No. 10,027,642 on Jul. 17, 2018, which is a Section 371 National Stage Application of International Application No. PCT/FR2012/052953, filed Dec. 17, 2012, which is published as WO 2013/093314 on Jun. 27, 2013, not in English; the contents of which are hereby incorporated by reference in their entireties.

FIELD OF THE DISCLOSURE

The invention relates generally to the field of telecommunications and more specifically to access by various telecommunications terminals to data stored by a server on a telecommunications network.

The present invention is particularly applicable to a system called 'cloud computing', i.e. a computer system that enables individuals to store their personal data on servers, but also enterprises that do not have their own servers to store their data on servers that they lease; the latter thus delegate their computing and storage operations to providers benefiting from computing infrastructures dispersed throughout the entire world and interconnected via a network. Access to this 'cloud computing' usually takes place via the Internet, and in this context a private user or a company employee accesses his/her applications and data hosted on a remote server through a 'virtual office', via any terminal connected to the network.

BACKGROUND OF THE DISCLOSURE

Thus in general, users connect to a server or service platform hosting a database containing their personal data—e.g. photos, videos, documents, etc.—from a computer terminal, such as a personal computer, in which a web page is downloaded for accessing an entry portal to the service platform, or from a software application previously installed on the computer terminal considered. By way of examples, such 'cloud' storage services for computer data are provided by companies such as Dropbox (Dropbox™, on-line file storage and sharing) or Google (Picasa Web Album™, photo management on the web).

For connecting to their personal space on the network, in the traditional way users enter a user identifier (login) and a password from their terminal connected to an IP (Internet Protocol) network. After the server verifies their identity, users access their personal data environment. Users can thus connect to their personal data environment hosted by the service platform from various computer terminals connected to the Internet in a fixed way (PC, for example) or on the move (smartphone, tablet computer, etc.).

In this context, each time users want to change computer terminal for connecting to their personal space, they must restart the connection procedure with identifier and password from the new terminal. In addition, if the aforementioned users wish to give access to their data environment to remote third-party users, equipped with their own terminal, they must pass on their personal identification data to these third-party users.

SUMMARY

A first aspect of the present invention relates to a method of access by a first telecommunications terminal to a database hosted by a service platform that is accessible via a telecommunications network. In accordance with the invention this method in general comprises:

(A)—transmitting to a second terminal associated with a subscriber identifier of a second telecommunications network, information representative of a request from the first terminal to access the database;

(B)—in the second terminal, sending a response to the access request to an authentication server of the platform;

(C)—in the authentication server, when a response to the access request is received, verifying the identifier of the subscriber to the second network, and validating or not validating access to the database by the first terminal according to the result of the aforementioned verification.

According to the method of the invention, defined above in general terms, access of the first terminal to the service platform database is conditioned by the authorization received from a second telecommunications terminal, e.g. a smartphone, of which the subscriber identifier—in practice the phone number (MSISDN number) stored in the SIM card of the phone, when this second phone is a mobile phone terminal—is authenticated by the authentication server.

In practice, when the second terminal is a mobile phone, the user of the second terminal owning the personal data stored on the network can thus quickly and simply authorize access to his/her personal data to another terminal with his/her mobile phone. Indeed, the MSISDN (Mobile Station ISDN Number) stored in the SIM (Subscriber Identity Module) card of the mobile phone is deducible from the response to the access request, then is authenticated in the server, which reliably ensures the origin of the response to the access request.

According to a particular embodiment of the invention, the first and second telecommunications terminals are connected to the same communications network. In this case the communications network for access to the service platform and the aforementioned second communications network are one and the same network. For example, the first and second terminals may both be mobile terminals connected to the same mobile phone network.

According to a first embodiment of the invention, step (A) of the aforementioned method includes:

(a1)—in the first telecommunications terminal, generating a request for access to the database, the request including information identifying the subscriber to the second telecommunications network, and sending the access request to the authentication server of the platform;

(a2)—in the authentication server, determining the second telecommunications terminal from the subscriber identification information retrieved from the access request received, then transmitting to the second terminal a request for authorizing access of the first terminal to the database.

In this embodiment, it is the authentication server that determines the second terminal (the mobile terminal) from the subscriber identification information. According to a particular feature of this embodiment, step (A) includes a preliminary operation of loading and displaying in the first terminal a web page for access to the authentication server of the service platform, the access request to the authentication server following a command from the user of the first terminal transmitted via said web page.

For example, the command from the user of the first terminal may simply be entering on the keyboard of the first terminal the phone number of the user of the second terminal. It is therefore not necessary for the first user to enter an identifier and a password as is the case in most of the known prior art applications.

According to another feature of the invention, the aforementioned step (B) of the method of access according to the invention includes:

(b1)—notification of the request for authorizing access in the second terminal; and (b2)—following an action by a user of the second terminal performed by means of a human-machine interface of the second terminal, sending to the authentication server a response to the request for authorizing access.

Thus, as disclosed above, in this first embodiment, it is the authentication server which acts as an intermediary between the user of the first terminal and the user of the second terminal, the owner of the data which the first user wishes to access. This embodiment is thus particularly suited to the situation in which the first and second users are remote from each other. In this context, access to the database by the first terminal can be used, for example, to run an application for sharing data from the database, the implementation whereof is validated by the user of the second terminal at the request of the user of the first terminal.

According to a feature of embodiment, still in the embodiment disclosed above, the method according to the invention includes the display in the second terminal of a graphical interface displaying information relating to access requests and to the state of connection with the service platform for a predetermined set of telecommunications terminals.

Thanks to this arrangement, the user of the second terminal has an effective and simple-to-use means for delivering then controlling access, by third-party users, to the data in the user's personal data space in the service platform.

According to a particular embodiment, for a predetermined set of first terminals identified in a list stored in the second terminal, a response to the access request received is automatically sent by the second terminal to the authentication server. For example, this response may be sent automatically after a predetermined duration (time delay) without any intervention by the user.

Thus, the second terminal automatically transmits a response to the authentication server without any intervention by the user of the second terminal, for a considered terminal in the list. For example, if the second terminal is a mobile phone and the first terminal is a tablet computer belonging to the same user, the latter is thus spared the validation step by sending a response to the authentication server, when the tablet is identified in the list.

According to a variant embodiment, the aforementioned list of first terminals is stored in the authentication server, the step (a2) of transmitting to the second terminal a request for authorizing access of the first terminal to the database is then not implemented when the first terminal is identified as being a terminal in the list, access of the first terminal to the database being automatically validated by the authentication server.

According to a second embodiment of the inventive method, which can be advantageously combined with the first embodiment disclosed above, the method includes a preliminary operation of loading and displaying in the first terminal a web page for access to the authentication server of the platform, and in which the web page for access to the authentication server of the service platform, displayed on a screen of the first terminal, represents a two-dimensional code automatically generated by the authentication server when the web page is downloaded; step (A) of transmitting information representative of a request for access to the database from the first terminal to the second terminal then consists in transmitting this two-dimensional code to a software application installed in the second terminal.

In particular, in this embodiment, in step (B), the response to the access request sent from the second terminal to the authentication server includes the aforementioned two-dimensional code. The authentication server then compares the code received with the code generated initially.

According to a preferred embodiment, the second telecommunications network is a mobile phone network, and the second terminal is a mobile phone of the smartphone type.

In this second embodiment, the transmission of the access request takes place directly from the first terminal to the second terminal, e.g. by the second terminal photographing the code displayed on the screen of the first terminal. It will then be appreciated that this embodiment is particularly suited to the situation in which the two terminals are located close to one another, e.g. in the same room. In this context, access to the database by the first terminal can be used, for example, to run an application for forwarding data display, from the second terminal to the first terminal, in the case, for example, where the first terminal has more extensive display capabilities than those of the second terminal. Of course, according to this second embodiment, the user of the first terminal and the user of the second terminal may be the same person.

According to a second aspect, the subject matter of the present invention is a telecommunications terminal including:

means of receiving information representative of a request from a first telecommunications terminal to access a database hosted by a service platform on a telecommunications network;

means of generating and sending a response to the access request to an authentication server of the service platform in order to verify a subscriber identifier of a second telecommunications network to which said telecommunications terminal is connected, and to validate access to the database by the first terminal according to the result of verifying the subscriber identifier.

According to a particular feature, such a telecommunications terminal according to the invention further comprises human-machine interface means suitable for notifying a terminal user of the aforementioned information representative of the access request, and sending a response to the access request to an authentication server, following an action by the user performed via the human-machine interface.

According to another feature of such a telecommunications terminal, the latter comprises graphical interface means suitable for displaying information relating to access requests and to the state of connection with the service platform for a predefined set of telecommunications terminals.

Thus the user of a (second) terminal according to the invention, the 'owner' of the data, may advantageously keep control of the connections in progress with the database for a predefined set of user terminals. In particular, the user of the terminal according to the invention will have, via the graphical interface, the possibility of interrupting a connection in progress between a first terminal among the predefined set of terminals, and the database.

According to a particular embodiment such a telecommunications terminal comprises means for receiving and reading a two-dimensional code transmitted by the first terminal, this code being representative of a request for access to the database by the first terminal. In this embodiment, the response to the access request sent to an authentication server includes the two-dimensional code.

According to a third aspect, the subject matter of the present invention is an authentication server for implementing a method of access to a database, as briefly disclosed above, this server including:

means of receiving a response to a request from a first telecommunications terminal to access the database, from a mobile phone terminal according to the invention; and means of verifying a subscriber identifier of a mobile phone network following the reception of the response to an access request, and validating access to the database by the first terminal according to the result of said verification.

It will be appreciated that such a server is particularly suited to a method of access to a database, as briefly disclosed above in the context of the first embodiment.

Moreover, such a server according to the invention comprises:

means of receiving a request for access to the database from the first terminal, the request including information identifying a subscriber to a mobile phone network;

means of determining a second telecommunications terminal from the subscriber identification information retrieved from the access request received; and, means of transmitting to the second terminal a request for authorizing access of the first terminal to the database.

Finally, according to a last aspect, the subject matter of the invention is a software module intended to be incorporated into a telecommunications terminal according to the invention, as briefly disclosed above, or intended to be incorporated into an authentication server according to the invention, as briefly disclosed above. Such a software module comprises program instructions the execution whereof by a computer processor is used to implement the steps of a method of access to a database, according to the invention, which are executed, as the case may be, in a telecommunications terminal according to the invention or in an authentication server according to the invention.

Furthermore, such a software module may use any programming language, and include programs in the form of source code, object code, or intermediate code between source code and object code, such as in a partially compiled form, or in any other desirable form.

Accordingly, the invention is also aimed at a medium for recording information readable by a computer, and comprising computer program instructions. Such a recording medium may also consist of any entity or device capable of storing such a program. For example, the medium may comprise a storage means, such as a ROM, e.g. a CD ROM or a microelectronic circuit ROM, or a removable recording means, such as a USB stick or a magnetic recording means, such as a hard disk. On the other hand, a software module according to the invention may in particular be downloaded from an Internet type network.

The advantages provided by a telecommunications terminal, an authentication server, a software module, as briefly defined above, are identical or contribute to those mentioned above in relation to the method of access to a database, according to the invention, and accordingly will not be recalled here.

BRIEF DESCRIPTION OF THE DRAWINGS

Other features and advantages of the present invention will emerge from the following detailed description, which makes reference to the accompanying drawings in which.

DETAILED DESCRIPTION OF ILLUSTRATIVE EMBODIMENTS

Figure 1:
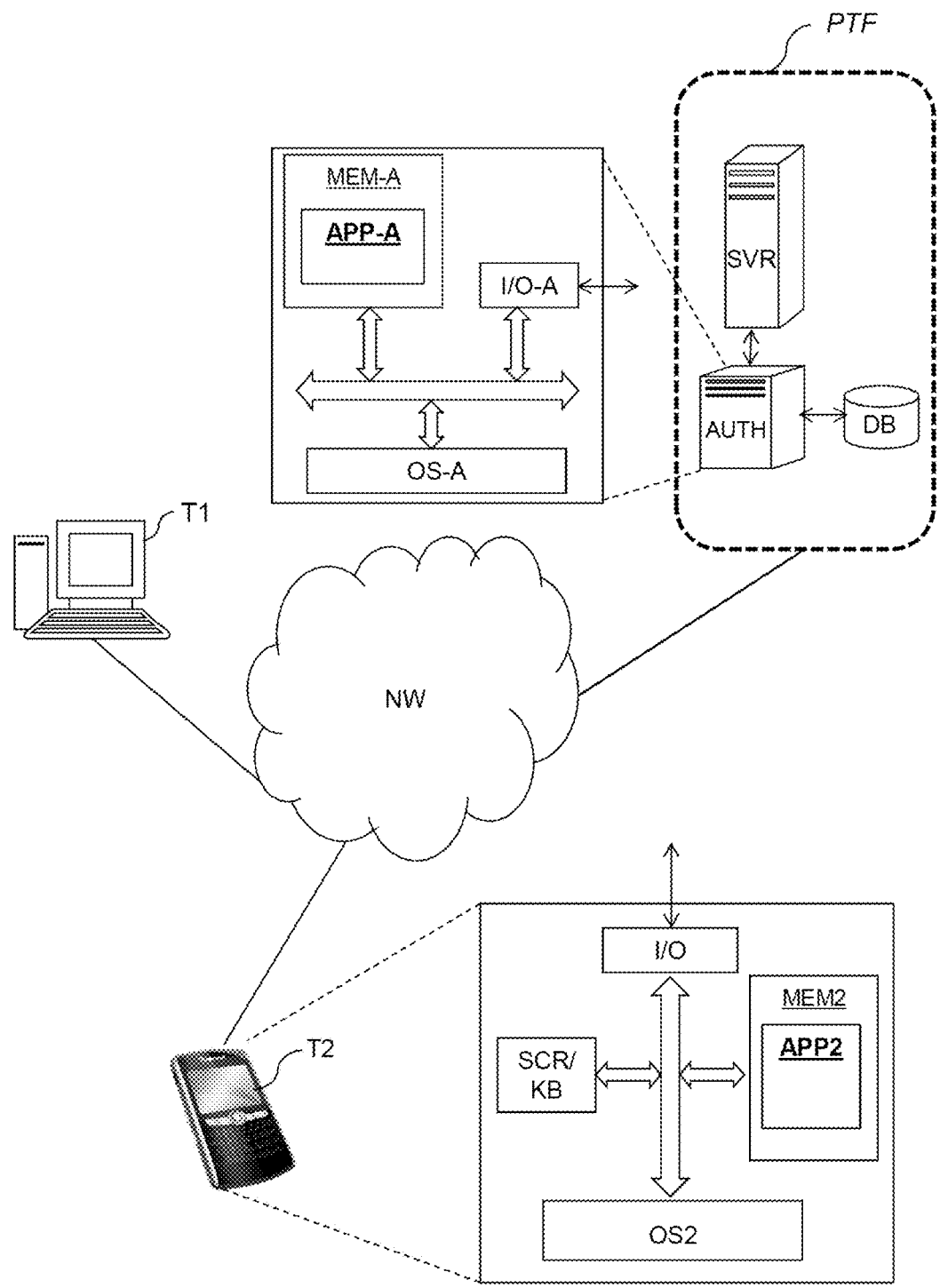
FIG. 1 illustrates a telecommunications system in which the invention is implemented, and in particular illustrates the functional elements incorporated respectively into a telecommunications terminal and into an authentication server, according to the invention.

FIG. 1 illustrates a telecommunications system in which the invention is implemented. As shown in FIG. 1, a first telecommunications terminal T1 is connected to the telecommunications network NW consisting here of an Internet type of IP network. The terminal T1 in this example of embodiment is a personal computer, but it may be a digital or touch-sensitive tablet computer, or a smartphone connected to the Internet.

The system also includes a service platform PTF connected to the network NW, which offers various services such as the storage of personal data 'in the cloud' (cloud storage)—e.g. multimedia documents such as videos, photos, text documents, etc. The service platform PTF includes an authentication server AUTH associated with a database DB of service users, and a data server SVR storing the personal data of registered users of the personal data storage service.

The user database (DB), associated with the authentication server, contains for each user of the service platform a stored list or a table containing a data storage service user or subscriber identifier—e.g. a user name—associated with at least one phone network subscriber identifier or a terminal identifier, e.g. a mobile phone number, a fixed IP phone number, an IP address. Moreover, such a user table may advantageously include another communication identifier, such as an email address. Thus, the user of a terminal T1 may use an email address as a user identifier for enabling the authentication server to identify a registered user in the user database (DB) and then to determine a terminal (T2) associated with the identified user.

The system shown also includes a second telecommunications terminal, T2, connected to the network NW. In the example of embodiment described and illustrated, the terminal T2 is a smartphone type of mobile phone. The mobile phone T2 is shown in FIG. 1 connected to the network NW for simplifying the disclosure. However, the terminal T2 may in practice be connected to the network NW through an access network, e.g. a WiFi network, or through a third generation mobile network (UMTS) (connection in data mode).

As shown in FIG. 1, the mobile terminal T2 in particular includes the following functional modules:
- An input/output communication module, denoted by 'I/O' and intended for communicating with the network NW.
- An operating system module, OS2, e.g. Google's Android™ operating system, handling the interaction between the various modules and the processor (not shown) of the terminal T2.
- A display device associated with a (touch-sensitive or mechanical) keyboard 'SCR/KB'.
- A memory module MEM2 in which a software application or module APP2 according to the invention is stored.

The module I/O is used in particular to receive information representative of a request from the first telecommunications terminal T1 to access the personal data of the user of the terminal T2 stored in the server SVR of the service platform PTF, then to communicate this information to the application APP2.

The application APP2 includes program instructions suitable for generating a response to the access request, then transmitted to the I/O module which in turn transmits it to the authentication server AUTH, through the network NW.

The application APP2 of the terminal T2 also includes instructions the execution whereof produces a human-machine interface—in practice a graphical interface displayed by the screen SCR of the terminal—via which the user of the terminal T2 receives notification of information representative of the access request, and enables the user to send a response to the access request to the authentication server.

In the mode of embodiment presented, the graphical interface produced by the application APP2 is suitable for displaying information relating to access requests and to the state of connection with the service platform PTF for a predetermined set of telecommunications terminals. This set of terminals may include other terminals of the main user of the terminal T2 (a mobile terminal in the illustrated mode of embodiment), such as, for example, a tablet computer or a home PC, or telecommunications terminals belonging to the persons chosen by the user of the terminal T2 (e.g. friends or family members).

According to a particular embodiment, the terminal T2 further includes a module for reading a two-dimensional code, integrated into or associated with the application APP2, and which in particular can be used to read a two-dimensional code transmitted by the first terminal T1, which code being representative of a request for access to the database by the terminal T1.

In this embodiment, a response to an access request transmitted by the terminal T2 to the authentication server includes such a two-dimensional code, the authentication server then comparing the code received with the code generated initially. In practice such a two-dimensional code may consist of a two-dimensional bar code such as a QR code.

According to a variant embodiment a terminal T2 according to the invention may be equipped with an NFC tag reader intended to read an NFC (Near Field Communication) tag, fitted into and programmed by the terminal T1.

Still in FIG. 1, the authentication server AUTH of the service platform PTF correlatively comprises the following functional modules:
- An input/output communication module, denoted by 'I/O-A' and intended for communicating with the network NW and receiving a request for access to the database from the first terminal T1, this access request including identification information for a registered user of the services provided by the service platform PTF. In the embodiment described, this user identification information is identification information for a subscriber to a second telecommunications network—here a mobile phone network, the identification information being, for example, the phone number associated with the SIM card incorporated into the terminal T2. The I/O-A module is also responsible for transmitting to the second terminal T2, identified thanks to the aforementioned identification information, a request for authorizing access of the first terminal T1.
- An operating system module, OS-A, handling the interaction between the various modules and the processor (not shown) of the server.
- A memory module MEM-A in which a software application or module APP-A according to the invention is stored, the program instructions whereof when they are executed by a processor (not shown) of the server AUTH are used to implement the steps of the method of access according to the invention which are implemented in the authentication server. In particular, the software module APP-A is designed for verifying an identifier of a second terminal T2—i.e. in the embodiment described, a subscriber identifier (phone number) of a mobile phone network—following the reception of a response to an access request, from the terminal T2; and for validating or not validating access to the database (SVR) by the first terminal T1 according to the result of the aforementioned verification.

Figure 2:
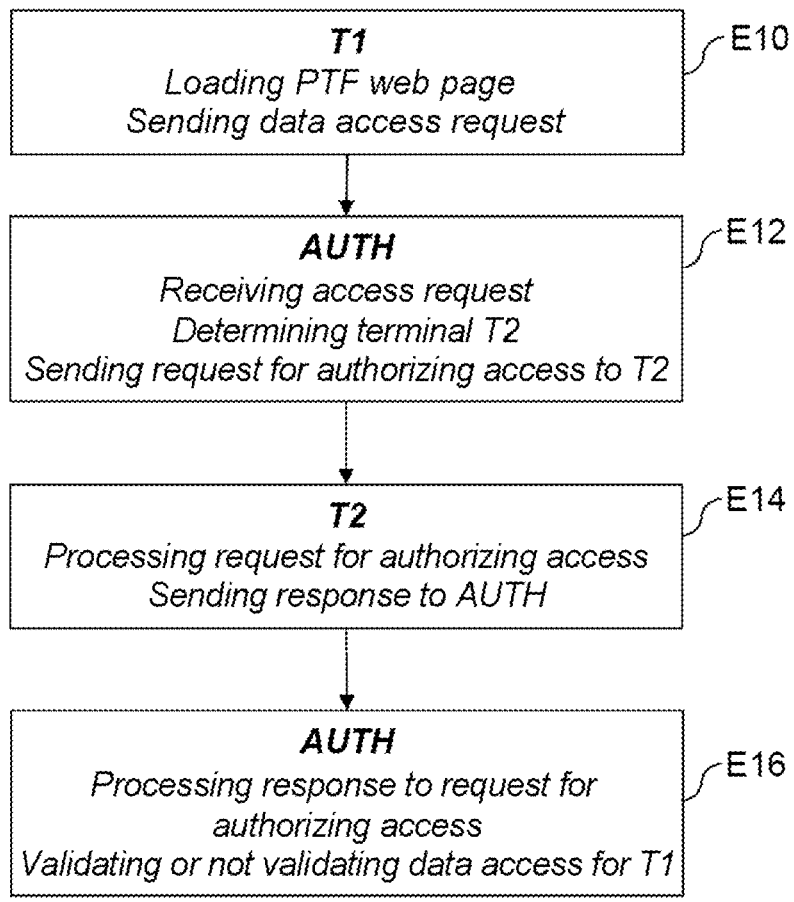
FIG. 2 shows in flowchart form the main steps of a method of access by a telecommunications terminal to a database hosted by a service platform, according to the invention.

FIG. 2 shows in flowchart form the main steps of the method of access by a telecommunications terminal T1 to a database SVR hosted by a service platform PTF.

As shown in FIG. 2, the method according to the invention begins with step E10 in the course of which the terminal T1, connected to the Internet, loads a web page for access to the authentication server AUTH of the service platform, e.g. an address of the type 'cloudphone.orange.fr'. The user of the terminal T1 knows at least one communication identifier for identifying the owner of the data that the user wishes to consult, e.g. a photo album. This communication identifier may be an email address, a fixed phone number, a mobile phone number or a person's name.

The user of the terminal T1 enters this identifier on the terminal screen, in a dedicated field of the web page. Assuming that this identifier is an email address, a data access request is then generated, which includes the identification information consisting of the email address of the owner of the data. The access request is then sent to the authentication server AUTH.

In the following step, E12, the authentication server receives the access request from the terminal T1, retrieves the identification information of a person, in this example an email address, and consults the user database DB with this email address as the input parameter, for obtaining at least one subscriber identifier of a communications network. In this example, the server AUTH obtains a mobile phone number. The authentication server then transmits to the mobile terminal T2 corresponding to the mobile phone number obtained, a request for authorizing access representative of the request from the first terminal to access the personal data of the person identified by the aforementioned mobile phone number, in the user database DB of the service platform PTF.

In the next step, E14, in the mobile terminal T2, the request for authorizing access is received by the application APP2 and notified to the terminal user, e.g. by a specific tone. According to variant embodiments, the notification to the terminal T2 of the request for authorizing access may be performed by sending an SMS or MMS type message, or by a phone call automatically initiated by an interactive voice server controlled by the authentication server. Once the request for authorizing access is notified to the user of the second terminal, the latter may then initiate, via the graphical user interface displayed by the application APP2 of the terminal T2, the sending of a response to the request for authorizing access, to the authentication server AUTH.

As disclosed earlier in the description, according to an advantageous mode of embodiment of the invention, the owner of the data to be shared and user of the terminal T2 has the possibility of predefining a list of terminals T1, stored in the terminal T2 or accessible on the network by the application APP2 of the terminal T2, for which a favorable response to the access request received is automatically sent by the second terminal to the authentication server. According to a variant embodiment which may be combined with the previous one, such a predefined list of terminals may be stored in the authentication server, in which case the step of transmitting a request for authorizing access to the terminal T2 is not implemented for the terminals identified in the aforementioned list.

In step E16, when the authentication server AUTH receives a response to the authorization request from the terminal T2, it analyzes the response and validates or does not validate access to the database by the first terminal according to the content of the response.

If access is validated, a data consultation session is established between the terminal T1 and the data server SVR. The application APP2 of the second terminal T2 displays a graphical user interface showing the status of the consultation session between the terminal T1 and the data server SVR, and the user of the terminal T2 thus has the possibility of controlling the session in progress.

In the second mode of embodiment presented earlier in the description, in the terminal T1, the web page for access to the authentication server of the service platform causes the display of a two-dimensional code automatically generated by the authentication server when the web page is downloaded. Step E12 in FIG. 2 is therefore 'short-circuited' since the two-dimensional code is transmitted directly from the first terminal T1 to the second terminal T2, e.g. by the code being photographed by the terminal T2. In this case, the response to the request for authorizing access, generated by the terminal T2 in step E14, includes the photographed code.

In practice, in the embodiments disclosed here, the exchanges between the terminals T1 and T2 and the server AUTH are implemented by commands using the known language XML (Extensible Markup Language) and transmitted according to the known communication protocol HTTP (HyperText Transfer Protocol).

Figure 3:
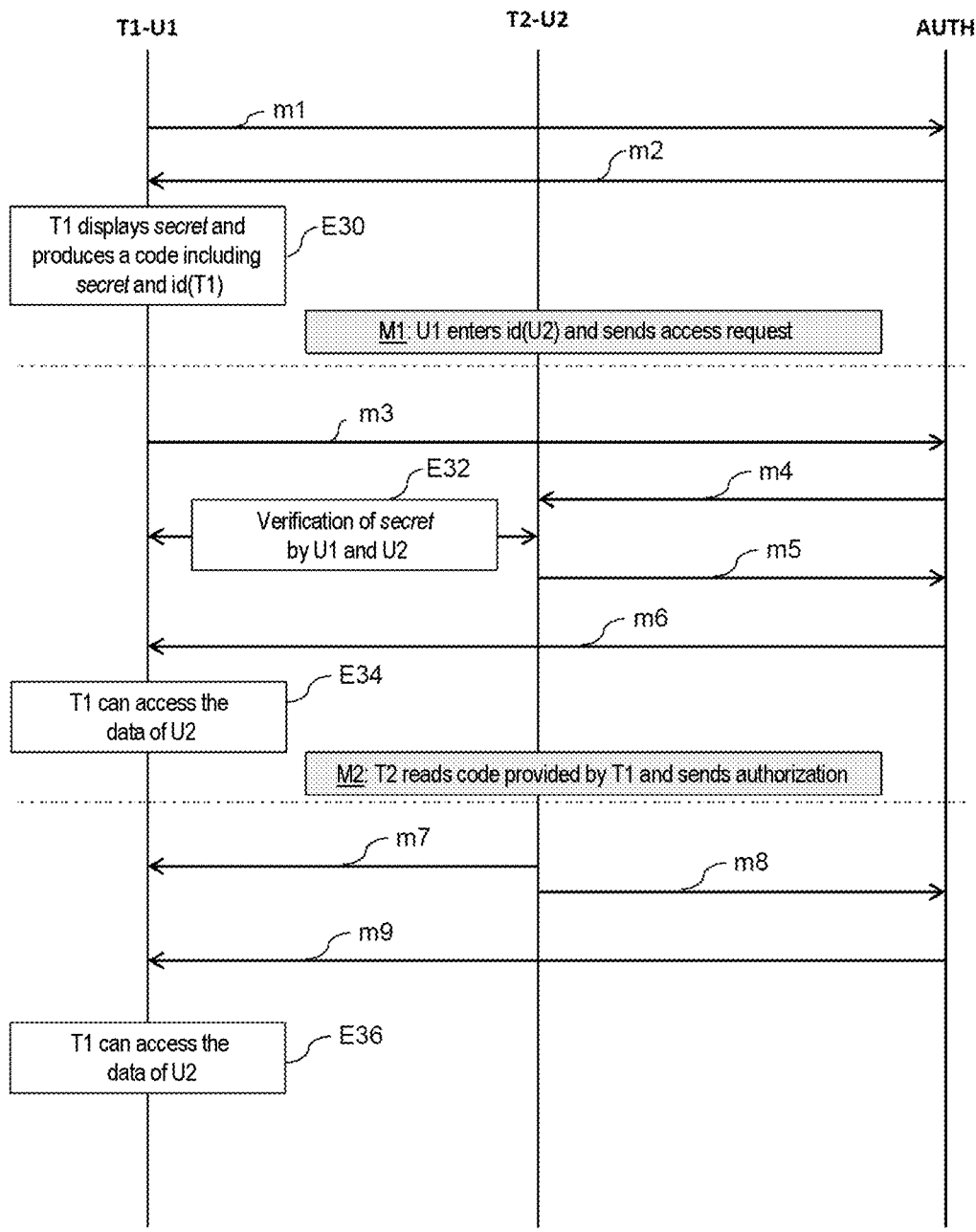
FIG. 3 illustrates an example of message exchanges between the various elements of the telecommunications system in FIG. 1, for implementing a method of access to a database, according to the invention.

FIG. 3 illustrates an example of message exchanges between the various elements of the telecommunications system in FIG. 1, for implementing a method of access to a database, according to the first and second embodiments of the invention. In FIG. 3, the references 'T1-U1', 'T2-U2' and AUTH and the corresponding vertical lines indicate the actions implemented respectively in the terminal T1 the user of which is U1, the terminal T2 the user of which is U2, and in the authentication server AUTH. FIG. 3 thus illustrates an example of a process of access by a user U1 of the terminal T1 to personal data, stored in the service platform (PTF), of a user U2 of the terminal T2.

The process begins with the sending of a message m1 from the terminal T1 to the server AUTH, which message m1 contains a request for a secret code from the terminal T1 to the server AUTH, of the form getSecret(T1), for example. In return the server AUTH transmits to the terminal T1 a message m2 containing a secret code randomly generated in the server. The message m2 contains a command of the form setSecret(secret), for example, where secret is the secret code. The preliminary exchange of a secret code between the server AUTH and the terminal T1 is thus used to further secure the method of access according to the invention.

Then, as shown in E30, after the terminal T1 has received the secret code, the latter is displayed on the terminal T1 and in parallel, an element, readable by an external device, containing the secret code and an identifier of the terminal T1 (e.g. its IP address), is produced in the terminal T1. This 'readable' element is, for example, a bar code such as a QR code or an NFC tag. Two cases are then to be considered, the case 'M1' corresponding to the first embodiment disclosed above, or the case 'M2' corresponding to the second embodiment disclosed above.

According to the first embodiment (M1), the user U1 of the first terminal T1 initiates, via the web page for access to the server AUTH, the transmission of a message m3 containing the data access request, to the server AUTH, the access request including an identifier of the user U2 (e.g. a mobile phone number). The message m3 contains a command of the form getAccess(T1, U2, secret), for example.

Following the reception of the message m3, the server AUTH determines the terminal T2 and sends it a message m4 containing a request for authorizing access of the terminal T1 to personal data of the user U2. This message m4 contains a command of the form getAccess(T1, secret), for example.

Following the reception of the message m4 in the terminal T2, according to the example of exchanges disclosed, as shown by the box E32, the user U2 having received the secret code (e.g. a four-digit code) enters into contact with the user U1 for verifying that the user U1 is in possession of the secret code, and therefore that the access request from the terminal T1 is truly genuine. This placing in contact of the user U2 with the user U1 may be carried out via voice communication, e.g. when the terminals T1 and T2 are geographically remote from each other, or via an oral communication when the terminals are close to each other (in the same room, for example), and the users U1 and U2 are different.

The optional operation above of verifying the secret code can be used in particular to ensure that the access request has not been sent by a hacker stealing the identity of the terminal T1.

If the terminal T1 is properly authenticated by the user U2, the user U2 initiates in the terminal T2 the sending to the destination server AUTH of a message m5 containing a favorable response to the authorization request contained in the message m4, e.g. a command of the form setAutorisation (T1, U2, secret).

In response, the server AUTH sends a message m6 to the terminal T1, the message m6 containing a digital authorization key enabling the terminal T1 to unlock access to the data that the user U1 wishes to consult and which are stored in the data server SVR of the service platform PTF. The message m6 contains a command of the form setAutorisation(autorisationKey), for example. The terminal T1 having received the authorization key or token, access by the terminal T1 to the data of the user U2 is then authorized (box E34) subject to the submission by the terminal T1 of the token to the authentication server AUTH; the user U1 may then consult the personal data of the user U2.

Still in FIG. 3, according to the second embodiment (M2) of the invention, disclosed above, following the downloading of the web page for access to the service platform, a readable element containing the secret code and the identifier of the terminal T1 is produced in the terminal T1 in the form of a bar code or an NFC tag programmed in the terminal T1. In this embodiment the terminal T2 located close to the terminal T1 and with a suitable reading device reads the secret code provided by the terminal T1 (represented by the arrow m7). Following the reading of the secret code, the computer application APP2, according to the invention, with which the terminal T2 is equipped, then automatically transmits to the authentication server AUTH the message m8, which contains a favorable response to the authorization request obtained by the terminal T2 reading (arrow m7) the aforementioned 'readable' element, produced in the terminal T1. The message m8 contains a command of the form setAutorisation(T1, U2, secret), for example.

Finally, just as for the first mode of operation, in response to the message m8, the server AUTH sends a message m9 to the terminal T1, the message m9 containing a digital authorization key enabling the terminal T1 to unlock access to the data that the user U1 wishes to consult and which are stored in the data server SVR of the service platform PTF. The message m9 contains a command of the form setAutorisation(autorisationKey), for example. The terminal T1 having received the authorization token, access by the terminal T1 to the data of the user U2 is then possible (box E36) subject to the submission by the terminal T1 of the authorization token to the authentication server AUTH, the user U1 may then consult the personal data of the user U2.

An exemplary embodiment of the present invention aims at improving the situation explained above in the background section in particular by enabling a user to use any terminal connected to the Internet for accessing personal data stored in the 'cloud' in improved conditions of security and convenience in use.

Although the present disclosure has been described with reference to one or more examples, workers skilled in the art will recognize that changes may be made in form and detail without departing from the scope of the disclosure and/or the appended claims.

The invention claimed is:

1. A method of access by a first telecommunications terminal to a database hosted by a service platform that is accessible via a first telecommunications network, wherein the method includes acts of:

transmitting, from the first telecommunications terminal to an authentication server of said service platform, a request for a secret code;

transmitting the secret code from the authentication server to the first telecommunications terminal in response to said request for the secret code;

loading and displaying in the first telecommunications terminal a web page for access to the authentication server of said service platform, wherein said web page for access to the authentication server of the service platform, displayed on a screen of the first telecommunications terminal, represents a two-dimensional code automatically generated in the first telecommunications terminal when said web page is downloaded, said two-dimensional code containing the secret code;

transmitting to a second telecommunications terminal associated with a subscriber identifier of a second telecommunications network, information representative of an access request from the first telecommunications terminal to access the database, which comprises transmitting said two-dimensional code to a software application installed in the second telecommunications terminal;

in the second telecommunications terminal, sending a response to said access request to the authentication server of said service platform, said response from the second telecommunications terminal authorizing the first telecommunications terminal or not to access the database; and in the authentication server, in response to receiving the response to the access request, verifying the subscriber identifier of said second telecommunications network, and validating or not validating access to the database by the first telecommunications terminal according to a result of said verification.

2. The method as claimed in claim 1, in which the act of transmitting to a second telecommunications terminal the information representative of the request to access the database includes:

(a1) -in the first telecommunications terminal, generating the access request for access to the database, said access request including the subscriber to identifier of the second telecommunications network and the two-dimensional code, and sending the access request to the authentication server of the service platform; and (a2) -in the authentication server, determining the second telecommunications terminal from said subscriber identifier retrieved from the access request, then transmitting to the second telecommunications terminal a request for authorizing access of the first telecommunications terminal to the database.

3. The method as claimed in claim 2, in which the act of the second telecommunications terminal sending a response to the access request includes:

(b1) -notification of the request for authorizing access in the second telecommunications terminal; and (b2) -following an action by a user of the second telecommunications terminal performed by using a human-machine interface of the second telecommunications terminal, sending a response to the request for authorizing access to the authentication server.

4. The method as claimed in claim 2, wherein the first telecommunications network is an Internet type network, and in which the act of transmitting to a second telecommunications terminal the information representative of the request to access the database includes, following the loading and displaying in the first telecommunications terminal the web page for access to the authentication server of said service platform, transmitting the access request to the authentication server following a command from the user of the first telecommunications terminal transmitted via said web page.

5. The method as claimed in claim 2, including the second telecommunications terminal displaying a graphical interface displaying information relating to access requests and to a state of connection with the service platform for a predetermined set of telecommunications terminals.

6. The method as claimed in claim 2, in which, for a predetermined list of first telecommunications terminals identified in a list stored in the second telecommunications terminal, a response to the request for authorizing access received is automatically sent by the second telecommunications terminal to the authentication server.

7. The method as claimed in claim 2, in which, for a predetermined list of first telecommunications terminals identified in a list stored in the authentication server, the act (a2) of transmitting to the second telecommunications terminal a request for authorizing access of the first telecommunications terminal to the database is not implemented when said first telecommunications terminal is identified as being a terminal in said list, access of the first telecommunications terminal to the database being automatically validated.

8. The method as claimed in claim 1, in which, the response to the access request sent by the second telecommunications terminal to the authentication server includes said two-dimensional code, the authentication server then comparing the two-dimensional code received with the code generated initially.

9. An authentication server for implementation of a method of access by a first telecommunications terminal to a database hosted by a service platform that is accessible via a first telecommunications network, said server including:
   a processor; and
   a non-transitory computer-readable medium comprising a software module stored thereon, the software module comprising program instructions, which when executed by the processor cause the authentication server to perform acts comprising:
   transmitting, upon receipt of a request for a secret code from the first telecommunications terminal, the secret code to the first telecommunications terminal in order to generate, in the first telecommunications terminal, a two-dimensional code containing the secret code when a web page for access to the authentication server of said service platform is downloaded in the first telecommunications terminal, said web page for access to the authentication server of the service platform, displayed on a screen of the first telecommunications terminal, representing said two-dimensional code;
   said two-dimensional code being destined to be transmitted to a software application installed in a second telecommunications terminal;
   receiving a response to an access request from the first telecommunications terminal to access said database from the second telecommunications terminal, said response from the second telecommunications terminal authorizing the first telecommunications terminal or not to access the database; and
   verifying a subscriber identifier of a second telecommunications network following the receiving of said response to the access request, and validating access to the database by the first telecommunications terminal according to a result of said verification.

10. The authentication server as claimed in claim 9, wherein execution of the program instructions by the processor further causes the authentication server to perform acts comprising:
   receiving a the access request for access to the database from the first telecommunications terminal, said access request including the subscriber identifier of the second telecommunications network;
   determining the second telecommunications terminal from said subscriber identifier retrieved from the access request received; and
   transmitting to the second telecommunications terminal a request for authorizing access of the first telecommunications terminal to the database.

11. At least one non-transitory computer-readable medium comprising at least one software module stored thereon and comprising program instructions the execution thereof by at least one computer processor implementing a method of access by a first telecommunications terminal to a database hosted by a service platform that is accessible via a first telecommunications network, wherein the method includes acts of:
   transmitting, from the first telecommunications terminal to an authentication server of said service platform, a request for a secret code;
   transmitting the secret code from the authentication server to the first telecommunications terminal in response to said request for the secret code;
   loading and displaying in the first telecommunications terminal a web page for access to the authentication server of said service platform, wherein said web page for access to the authentication server of the service platform, displayed on a screen of the first telecommunications terminal, represents a two-dimensional code automatically generated in the first telecommunications terminal when said web page is downloaded, said two-dimensional code containing the secret code;
   transmitting to a second telecommunications terminal associated with a subscriber identifier of a second telecommunications network, information representative of an access request from the first telecommunications terminal to access the database, which comprises transmitting said two-dimensional code to a software application installed in the second telecommunications terminal;
   in the second telecommunications terminal, sending a response to said access request to the authentication server of said service platform, said response from the second telecommunications terminal authorizing the first telecommunications terminal or not to access the database; and
   in the authentication server, in response to receiving the response to the access request, verifying the subscriber identifier of said second telecommunications network, and validating or not validating access to the database by the first telecommunications terminal according to a result of said verification.

* * * * *